(12) United States Patent
Ooya

(10) Patent No.: US 9,128,655 B2
(45) Date of Patent: Sep. 8, 2015

(54) INFORMATION PROCESSING APPARATUS, SYSTEM AND METHOD FOR DETERMINING WHETHER TO DISPLAY ERROR INFORMATION

(75) Inventor: Hiroshi Ooya, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 298 days.

(21) Appl. No.: 12/950,934

(22) Filed: Nov. 19, 2010

(65) Prior Publication Data

US 2011/0161746 A1   Jun. 30, 2011

(30) Foreign Application Priority Data

Dec. 28, 2009  (JP) ................................ 2009-298832

(51) Int. Cl.
*G06K 15/00* (2006.01)
*G06F 3/12* (2006.01)
*G06F 11/07* (2006.01)

(52) U.S. Cl.
CPC .............. *G06F 3/1285* (2013.01); *G06F 3/121* (2013.01); *G06F 3/1207* (2013.01); *G06F 3/1234* (2013.01); *G06F 3/1259* (2013.01); *G06F 11/0733* (2013.01); *G06F 11/0793* (2013.01)

(58) Field of Classification Search
CPC .... G03G 15/55; G03G 15/553; G06F 11/327; G06F 3/1285; G06F 11/0784
USPC ............. 358/1.14, 1.13, 1.15, 1.16, 401, 437, 358/474; 399/9; 713/2; 714/24, 57
See application file for complete search history.

(56) References Cited

U.S. PATENT DOCUMENTS

| 5,539,499 | A | * | 7/1996 | Fujisawa ............................ 399/9 |
| 5,699,494 | A | * | 12/1997 | Colbert et al. ............... 358/1.15 |
| 5,859,956 | A | * | 1/1999 | Sugiyama et al. ........... 358/1.13 |
| 2004/0165209 | A1 | * | 8/2004 | Aoki et al. ................... 358/1.14 |
| 2007/0109586 | A1 | * | 5/2007 | Yamada et al. ............... 358/1.14 |
| 2008/0030756 | A1 | * | 2/2008 | Carney et al. ................ 358/1.13 |
| 2008/0144127 | A1 | * | 6/2008 | Tian .............................. 358/474 |
| 2008/0304095 | A1 | * | 12/2008 | Saito ............................ 358/1.14 |

FOREIGN PATENT DOCUMENTS

| JP | 2001047701 A | 2/2001 |
| JP | 2002-36679 A | 2/2002 |

(Continued)

OTHER PUBLICATIONS

Chinese Office Action dated Oct. 28, 2013 issued in corresponding Chinese Patent Application No. 201010621818.7

*Primary Examiner* — David S Cammack
(74) *Attorney, Agent, or Firm* — Fitzpatrick, Cella, Harper & Scinto

(57) ABSTRACT

A reception unit receives, in a case where an error has occurred in an image forming apparatus during execution of a designated job, error information indicating that the error has occurred. An acquisition unit acquires information indicating that it is designated to skip the error and to execute the job in the image forming apparatus. A determination unit determines, in a case where the acquisition unit acquires the information, whether or not to continue to display the error information depending on a type of the error. A control unit continues, in a case where the determination unit determines that the error information is continued to be displayed, to display the error information, and ceases, in a case where the determination unit determines that the error information is not continued to be displayed, to display the error information.

8 Claims, 8 Drawing Sheets

(56) References Cited

FOREIGN PATENT DOCUMENTS

| | | | |
|---|---|---|---|
| JP | 2003-170643 A | | 6/2003 |
| JP | 2004-243746 A | | 9/2004 |
| JP | 2004243746 A | * | 9/2004 |
| JP | 2006-159732 A | | 6/2006 |
| JP | 2009-140228 A | | 6/2009 |

* cited by examiner

| ERROR THAT REQUIRES ERROR CONTINUOUS DISPLAY | ERROR THAT DOES NOT REQUIRE ERROR CONTINUOUS DISPLAY |
|---|---|
| TONER SERVICE LIFE 1 | DISK FULL |
| PRINT OVERRUN | MISPRINT |
| DENSITY ADJUSTMENT ERROR | ABSENCE OF JOB SHEET |
| REGISTRATION ADJUSTMENT ERROR | PRESENCE OF ONE MANUALLY INSERTED SHEET |
| SHEET MISMATCH | |
| SHEET EXCHANGE | |
| MANUAL SHEET INSERTION | |

INFORMATION PROCESSING APPARATUS,
SYSTEM AND METHOD FOR DETERMINING
WHETHER TO DISPLAY ERROR
INFORMATION

BACKGROUND OF THE INVENTION

1. Field of the Invention

The present invention relates to an information processing apparatus, a control method of the information processing apparatus, and an information processing system.

2. Description of the Related Art

In recent years, in order to promote work efficiency, printers and multi-function peripherals (MFPs) are introduced into an office, and are used via a network. In this situation, inexpensive printers and MFPs, each of which are assumed to be originally placed on the desk side and to be connected to a PC via a USB interface, are introduced into an office, and the opportunity of using them via a network in place of the USB interface is increasing. Note that "USB" is an abbreviation for "Universal Serial Bus", and "PC" is an abbreviation for "Personal Computer".

In this environment, when the user carries out a print operation via the network, and goes to a remote printer for printed materials, that print operation is often not completed due to an error. At this time, if the printer has a liquid crystal screen, it can display the contents of the error that has occurred on the liquid crystal screen. In case of a skippable error, the printer can further display that fact. Then, by checking this error display, the user judges whether or not the error can be skipped. If the user determines that the error can be skipped, he or she presses an error skip button equipped on the printer to continue the print operation while ignoring the occurred error. Japanese Patent Laid-Open No. 2001-047701 discloses a technique that allows the same user not to confirm an error which has been skipped, so as to reduce the load on the user upon checking whether or not to skip an error.

However, for example, some low-cost printers are not equipped with any liquid crystal screen so as to reduce cost. For such low-cost printer having no liquid crystal screen, an application that allows the user to confirm details of an error status of the printer on the PC side is normally prepared. However, with this application, if the user finds occurrence of an error only when he or she inputs a print designation to the printer via the network and goes from the PC to the distant printer for printed materials, the user has to go back to the PC from which the print designation was input, so as to grasp a cause of the error. This imposes a heavy load on the user.

At this time, some printers are designed to allow a forced print operation if the error does not cause any print trouble, and the user presses an error skip button at his or her judgment. In this case, the load on the user can be reduced. However, when the forced print operation is performed by pressing the error skip button, the application on the PC also cancels the error display. Hence, the user cannot recognize why the error has occurred.

SUMMARY OF THE INVENTION

The present invention has been made in consideration of the aforementioned problems, and provides a technique for reducing the load on the user upon confirming a cause of en error when a skippable error has occurred in an information processing apparatus.

According to the first aspect of the present invention, there is provided an information processing apparatus comprising: a designation unit configured to designate an image forming apparatus to execute a job; a reception unit configured to receive, in a case where an error has occurred in the image forming apparatus during execution of the job designated by the designation unit, error information indicating that the error has occurred; a display unit configured to display the error information; an acquisition unit configured to acquire information indicating that it is designated to skip the error and to execute the job in the image forming apparatus; a determination unit configured to determine, in a case where the acquisition unit acquires the information, whether or not to continue to display the error information displayed by the display unit depending on a type of the error; and a control unit configured to continue, in a case where the determination unit determines that the error information displayed by the display unit is continued to be displayed, to display the error information displayed by the display unit, and to cease, in a case where the determination unit determines that the error information displayed by the display unit is not continued to be displayed, to display the error information displayed by the display unit.

According to the second aspect of the present invention, there is provided an information processing system including a plurality of information processing apparatuses and an image forming apparatus connectable to each of the plurality of information processing apparatuses, the information processing apparatus comprises: a designation unit configured to designate the image forming apparatus to execute a job; a reception unit configured to receive, in a case where an error has occurred in the image forming apparatus during execution of the job designated by the designation unit, error information indicating that the error has occurred; a display unit configured to display the error information; an acquisition unit configured to acquire information indicating that it is designated to skip the error and to execute the job in the image forming apparatus; a determination unit configured to determine, in a case where the acquisition unit acquires the information, whether or not to continue to display the error information displayed by the display unit depending on a type of the error; and a control unit configured to continue, in a case where the determination unit determines that the error information displayed by the display unit is continued to be displayed, to display the error information displayed by the display unit, and to cease, in a case where the determination unit determines that the error information displayed by the display unit is not continued to be displayed, to display the error information displayed by the display unit, and the image forming apparatus comprises: a unit configured to execute the job based on the designation from the designation unit; and a unit configured to transmit the error information when the error has occurred during execution of the job.

According to the third aspect of the present invention, there is provided a control method of an information processing apparatus, comprising: a designation step of controlling a designation unit to designate an image forming apparatus to execute a job; a reception step of controlling a reception unit to receive, in a case where an error has occurred in the image forming apparatus during execution of the job designated in the designation step, error information indicating that the error has occurred; a display step of controlling a display unit to display the error information; an acquisition step of controlling an acquisition unit to acquire information indicating that it is designated to skip the error and to execute the job in the image forming apparatus; a determination step of controlling a determination unit to determine, in a case where the information is acquired in the acquisition step, whether or not to continue to display the error information displayed by the display unit depending on a type of the error; and a control step of controlling a control unit to continue, in a case where it is determined in the determination step that the error information displayed by the display unit is continued to be displayed, to display the error information displayed by the display unit, and to cease, in a case where it is determined in the determination step that the error information displayed by the display unit is not continued to be displayed, to display the error information displayed by the display unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

First Embodiment

Figure 1:
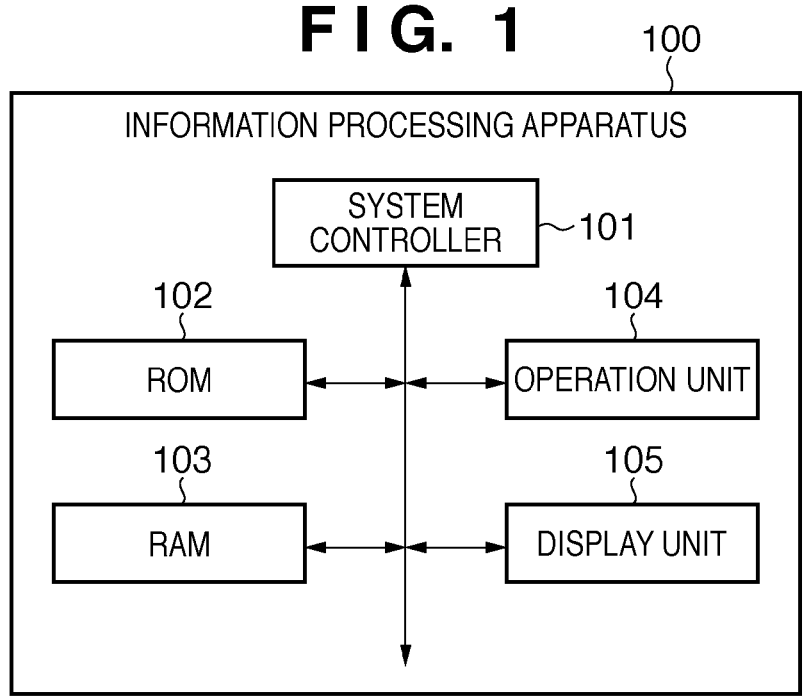
FIG. 1 is a block diagram showing the hardware arrangement of an information processing apparatus.

FIG. 1 is a block diagram showing the hardware arrangement of an information processing apparatus 100 according to the first embodiment. The information processing apparatus 100 includes a system controller 101, ROM 102, RAM 103, operation unit 104, and display unit 105. The system controller 101 is a processing device such as a CPU, and executes various kinds of processing to be executed by the information processing apparatus. The ROM 102 is a nonvolatile storage device, and stores various control programs and initial setting values of the information processing apparatus. The RAM 103 is a volatile storage device, and is used as a work area of various kinds of processing to be executed by the information processing apparatus. In this embodiment, software included in the information processing apparatus 100 is stored in this RAM 103 when it is executed.

The operation unit 104 has an input device such as a keyboard/mouse. The operation unit 104 monitors an input, and notifies the system controller 101 of the input information. The display unit 105 has an output device such as a display, and displays an output under the control of the system controller 101.

Figure 2:
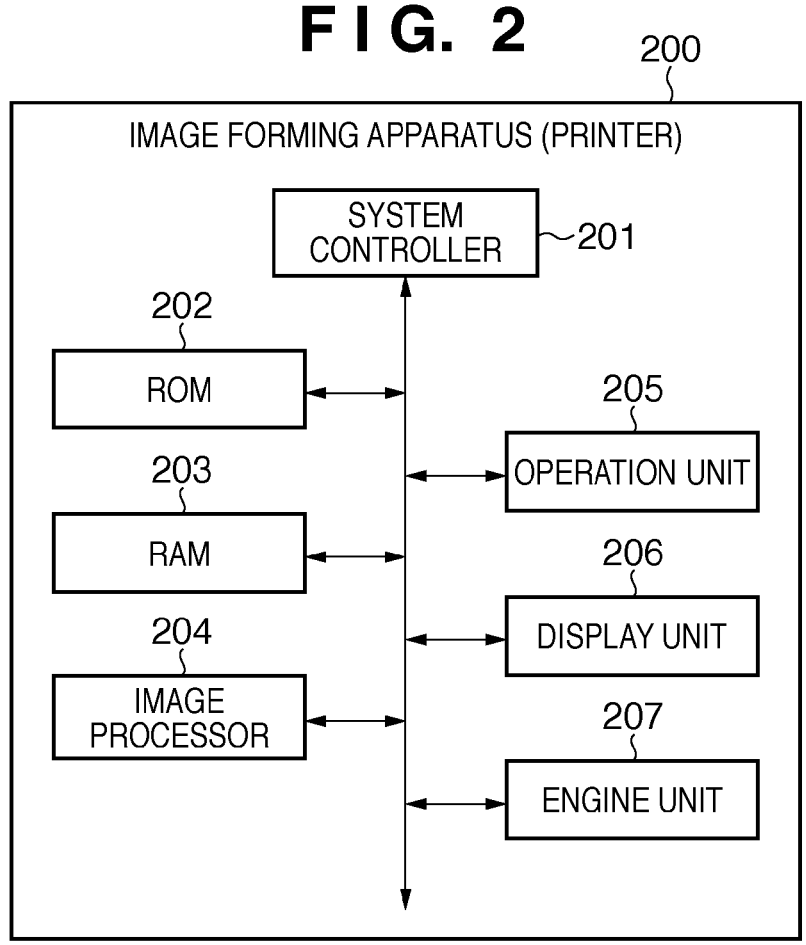
FIG. 2 is a block diagram showing the hardware arrangement of an image forming apparatus.

FIG. 2 is a block diagram showing the hardware arrangement of an image forming apparatus according to the first embodiment. This embodiment will exemplify a printer (especially, a laser beam printer), but the present invention is also applicable to an ink-jet printer, MFP, and the like. This embodiment will explain a printer having no panel on its housing. A printer 200 includes a system controller 201, ROM 202, RAM 203, image processor 204, operation unit 205, display unit 206, and engine unit 207.

The system controller 201 is a processing device such as a CPU, and has a function of executing various kinds of processing to be executed by the printer 200. Also, the system controller 201 has a serial communication apparatus with the engine unit 207. The ROM 202 is a nonvolatile storage device, and stores various control programs and initial setting values of a printing apparatus. In this embodiment, software included in the printer 200 is recorded in this ROM 202 and is stored in the RAM as needed when it is executed.

The RAM 203 is a volatile storage device, and is used as a work area for various kinds of processing to be executed by the printing apparatus. In this embodiment, software included in the printer 200 is stored in this RAM 203 when it is executed. The image processor 204 is an integrated circuit such as an ASIC, and executes various kinds of image processing under the control of the system controller 201.

Figure 3:
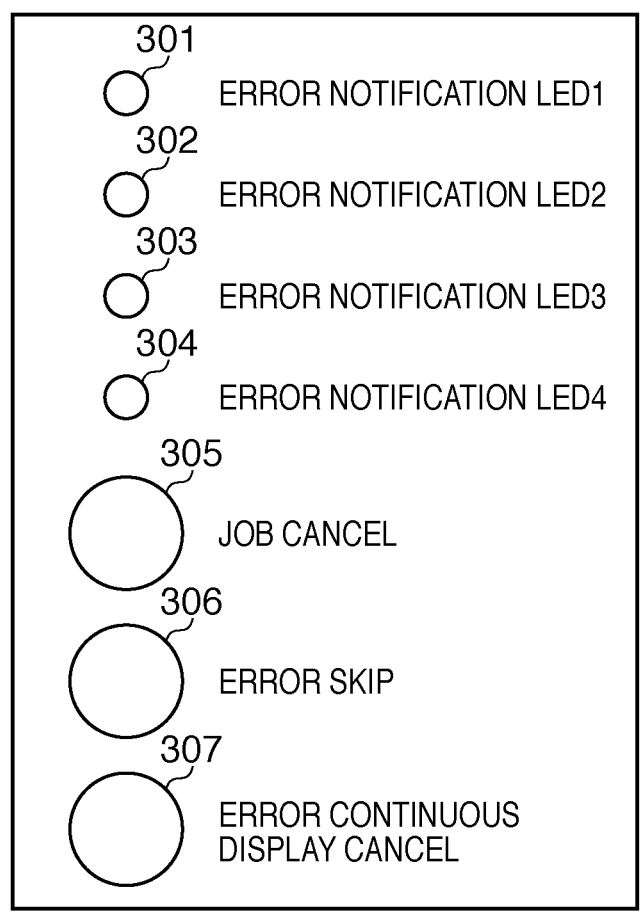
FIG. 3 is a view showing an example of an operation unit and display unit included in the image forming apparatus.

The operation unit 205 is an input device such as buttons, and the system controller 201 always monitors an input state. The operation unit 205 includes a job cancel button 305, error skip button 306, and error continuous display cancel button 307, as shown in FIG. 3.

The display unit 206 includes display devices such as LEDs, and makes indications under the control of the system controller 201. The display unit 206 includes error notification LED1 301 to LED4 304, and blinks the respective LEDs according to errors that have occurred, as shown in FIG. 3.

The engine unit 207 includes devices such as a sheet conveyance system, laser beam control system, and fixing unit system, which are used to actually print an image on a sheet, a storage device and control device used to execute print control, and a serial communication apparatus used to communicate with the system controller 201.

Figure 4:
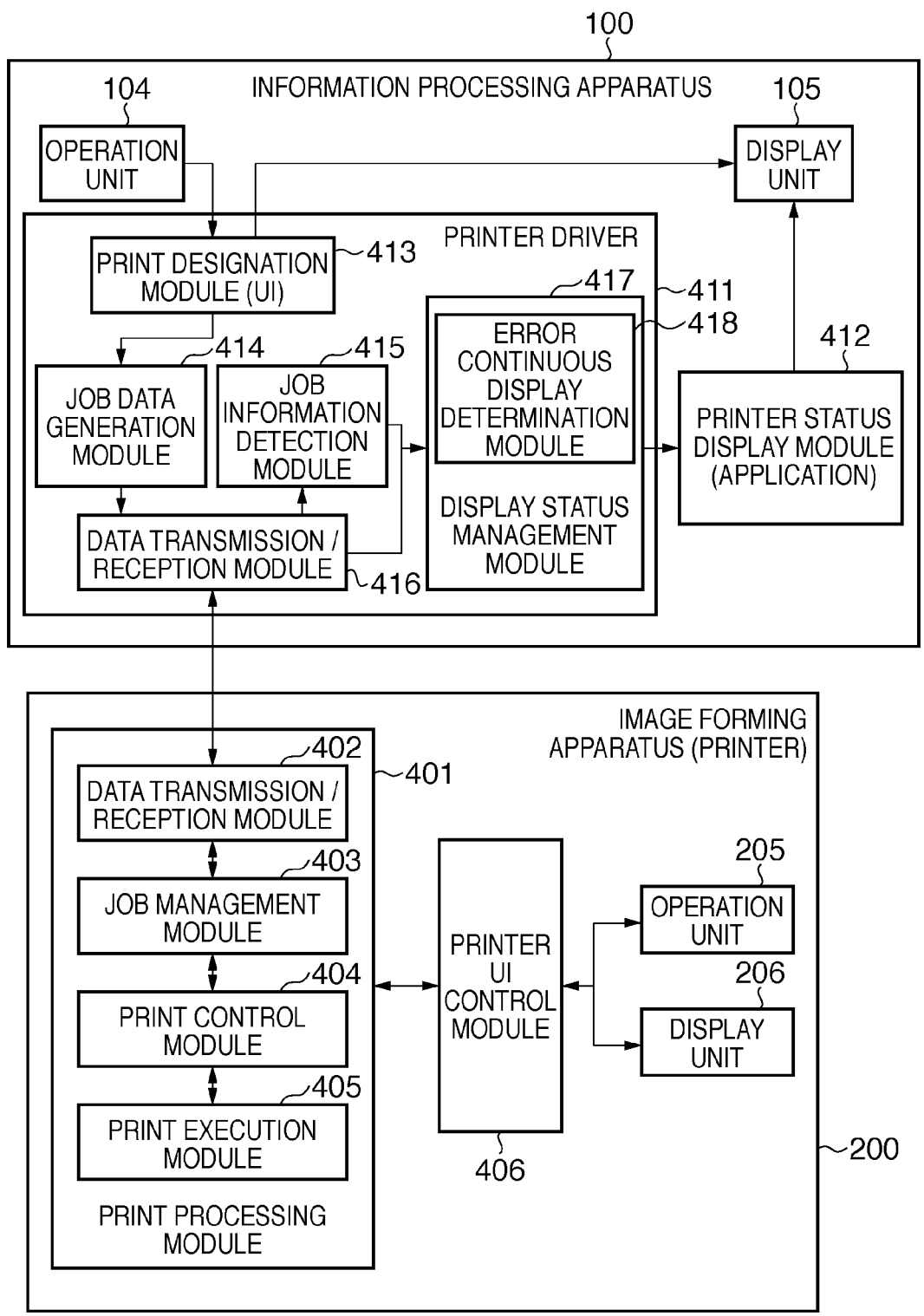
FIG. 4 is a block diagram showing the software configurations of the information processing apparatus and image forming apparatus.

FIG. 4 is a block diagram showing the software configuration of an overall system according to the first embodiment. The printer 200 shown in FIG. 4 roughly includes a print processing module 401 and printer UI control module 406. These software programs and modules 402 to 405 included in these programs are recorded in the ROM 202, are stored in the RAM 203 as needed, and are executed by the system controller 201.

The print processing module 401 includes a data transmission/reception module 402, job management module 403, print control module 404, and print execution module 405, and implements a print function of the printer 200. The data transmission/reception module 402 receives job data transmitted from the information processing apparatus 100 in the printer 200. Note that the job data includes information required for print processing such as a resolution in each page, a height and width of image data, and image data itself together with a user ID who transmitted the job. The data transmission/reception module 402 transmits job data to be executed by the printer 200 and information indicating pressing of the error skip button 306 (FIG. 3) to the information processing apparatus 100.

The job management module 403 manages jobs held by the printer 200 based on job data received by the data transmission/reception module 402 and job data whose print processing is in progress in the print execution module 405 under the control of the print control module 404. Furthermore, assume that the cancel button or error skip button is pressed on the operation unit 205 or a printer status display module 412. In this case, the job management module 403 receives this information via the printer UI control module 406, and issues a print cancel or restart designation to the print control module 404 according to that information.

The print control module 404 sets how to print respective pages in the print execution module 405 based on job data managed by the job management module 403, and manages print statuses of the respective pages. The print execution module 405 executes required image processing in the image processor 204, and prints an image by fixing toners on a medium such as a sheet according to the settings from the print control module 404.

When a print error in the print processing module 401 of the printer is detected, the printer UI control module 406 receives that error information, and executes control for blinking the buttons and LEDs of the operation unit 205 and display unit 206. When the user makes a setting or inputs a designation associated with print processing on the operation unit 205, the printer UI control module 406 transfers information of the setting or designation to the print control module 404 to reflect it in the print processing.

The information processing apparatus 100 shown in FIG. 4 roughly includes a printer driver 411 and printer status display module 412. These software programs and modules 413 to 418 included in these programs are recorded on the ROM 102, are stored in the RAM 103 as needed, and are executed by the system controller 101.

When the user inputs a print designation from an application on the information processing apparatus, the printer driver 411 can designate a print method for the printer 200, and can convert data received from the application into a printer format.

The printer status display module 412 displays printer statuses and settings for the user. The printer status display module 412 also has buttons corresponding to the job cancel button 305 and error skip button 306 (FIG. 3) on the operation unit 205 on the printer 200. Upon pressing this button, the same effect obtained as that upon pressing the button on the operation unit 205 can be obtained. However, when the user presses the error skip button on the printer status display module 412, an error continuous display determination module 418 (to be described later) does not function. This is because when the user presses the error skip button on the printer status display module 412, since he or she executes an error skip operation after he or she confirms error contents, a redundant display is made if the error contents are continuously displayed.

A print designation module 413 displays a setting screen on the display unit 105 when the user designates a print method and the like upon execution of print processing. The print designation module 413 receives inputs from the operation unit 104, and displays setting statuses on the display unit 105. When the print method is settled by receiving user's inputs, the print designation module 413 notifies a job data generation module 414 of information of that print method.

The job data generation module 414 generates job data by converting image data according to items designated by the user on the print designation module 413 and converting information associated with a job into a format that the printer can interpret. A job information detection module 415 receives information such as execution statuses of a job whose print processing is executed by the printer 200 and that which has already been transmitted to the printer 200, and recognizes states of the respective jobs.

A data transmission/reception module 416 transmits job data generated by the job data generation module 414 to the printer 200. Also, the data transmission/reception module 416 receives information of each job held by the printer and information, for example, indicating that the error skip button is pressed on the operation unit 205 on the printer 200 from the printer 200.

A display status management module 417 includes the error continuous display determination module 418. This display status management module 417 decides a status to be displayed by the printer status display module 412. The display status management module 417 designates the printer UI control module 406 to control display contents on the display unit 206. The display status management module 417 normally controls the printer status display module 412 and display unit 206 to display the status of the printer 200 intact. However, assume that an error has occurred during print processing, the user presses the error skip button 306 (FIG. 3), and the error continuous display determination module 418 determines that an error continuous display is required. In this case, the display status management module 417 controls to continuously display the contents of the skipped error even after the print processing. The display status management module 417 acquires information required for the error continuous display determination module 418 to determine whether or not to require an error continuous display from the job information detection module 415 and data transmission/reception module 416.

The error continuous display determination module 418 functions when the user presses the error skip button 306 (FIG. 3) on the operation unit 205 on the printer 200. The error continuous display determination module 418 acquires the following pieces of information from the job information detection module 415 and data transmission/reception module 416, and determines whether or not to require an error continuous display:

information associated with a skipped error (what kind of error has occurred, an error type);
  the presence/absence of a subsequent job;
  detailed information of the subsequent job if the subsequent job is present;
  a user ID which entered the subsequent job;
  a sheet size to be printed by the subsequent job; and the like.

Figure 5:
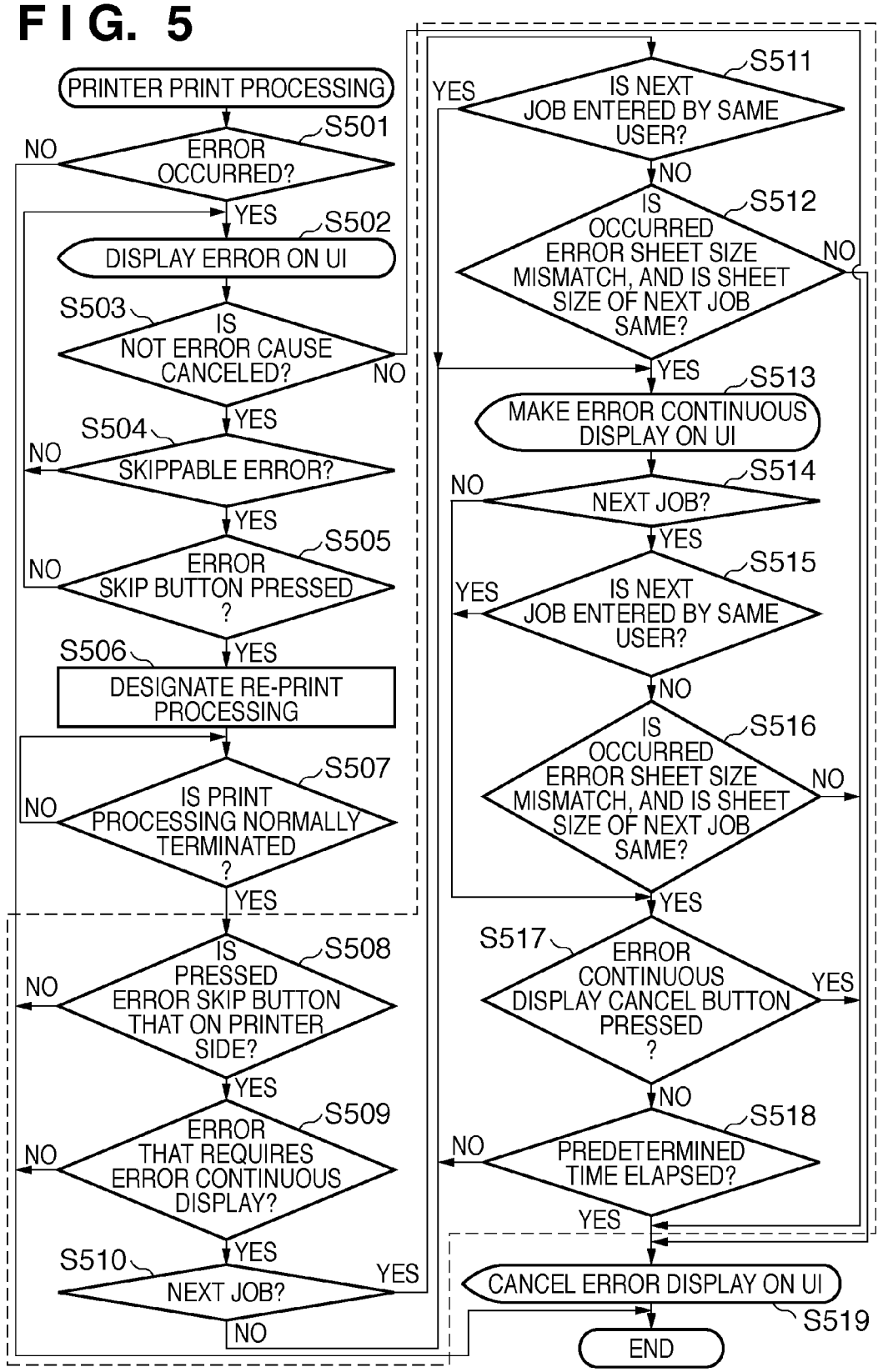
FIG. 5 is a flowchart of error continuous display processing after an error is skipped in the information processing apparatus.

FIG. 5 is a flowchart showing the operation in the information processing apparatus according to this embodiment. Details of the processing in the error continuous display determination module 418 will be described later. Steps bounded by the broken line in the flowchart shown in FIG. 5 correspond to the processing in the error continuous display determination module 418.

Figure 6A:
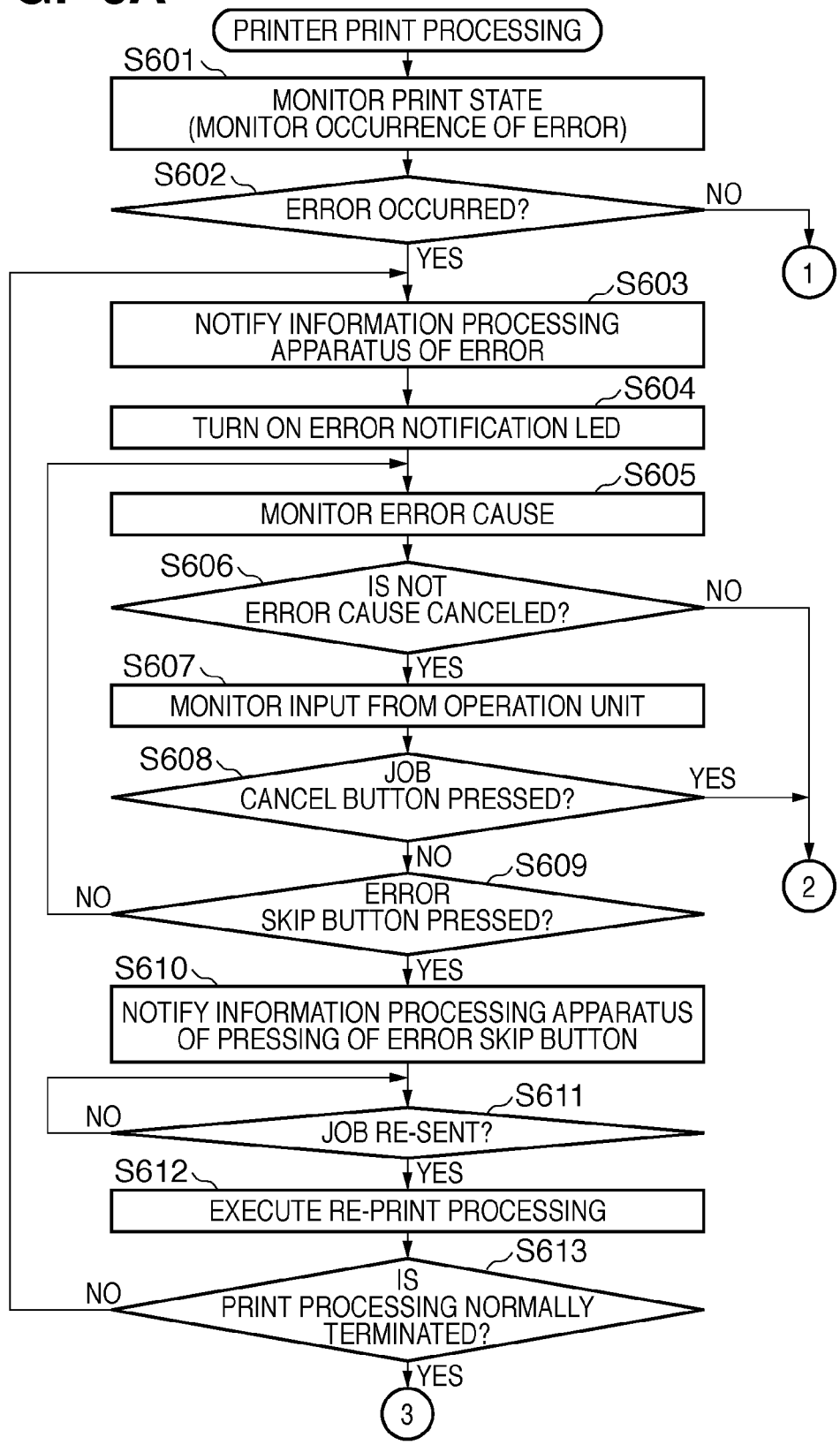
FIGS. 6A and 6B are flowcharts of error continuous display processing after an error is skipped in the image forming apparatus.
Figure 6B:
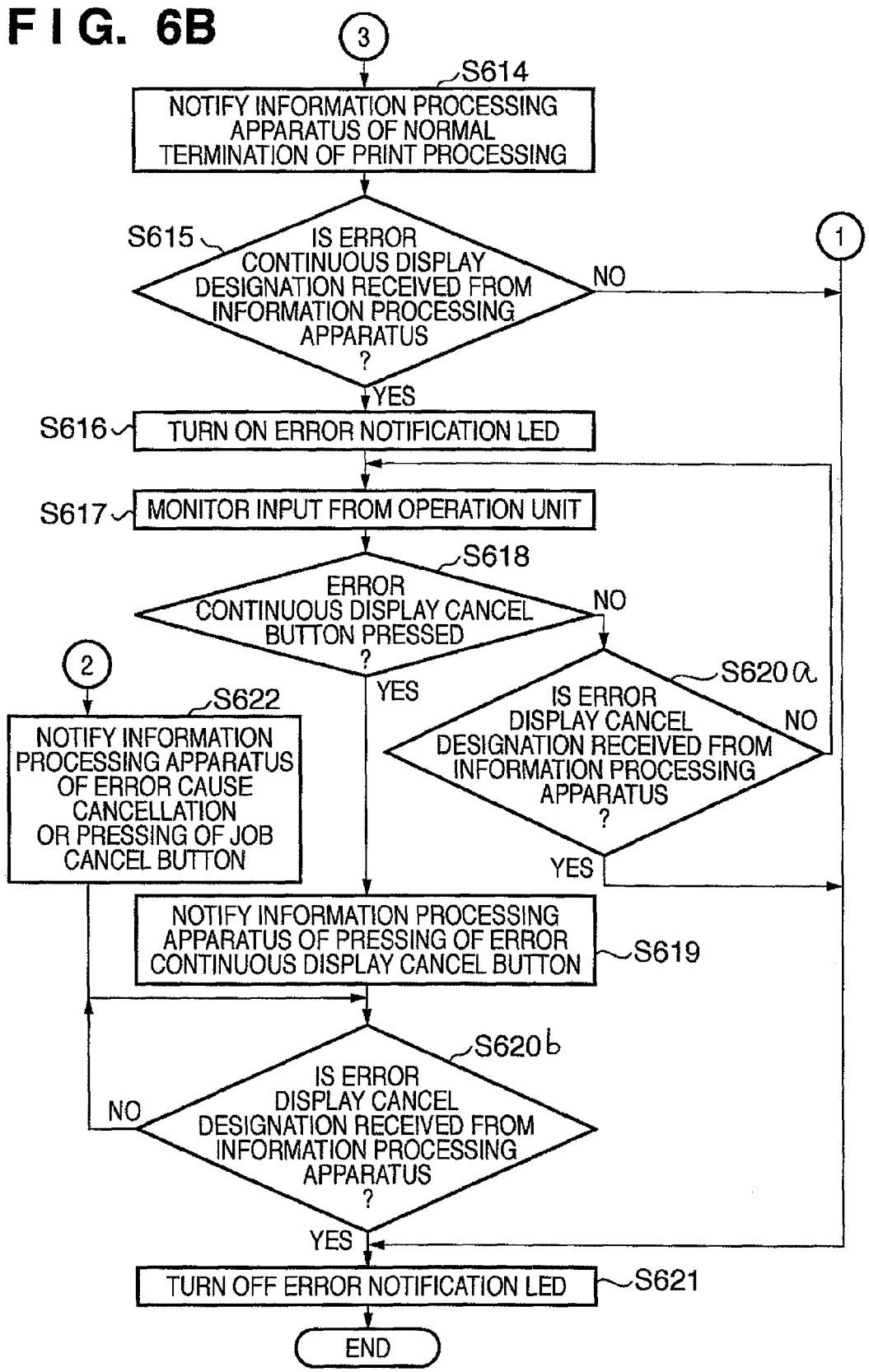
Figures 7, 8:
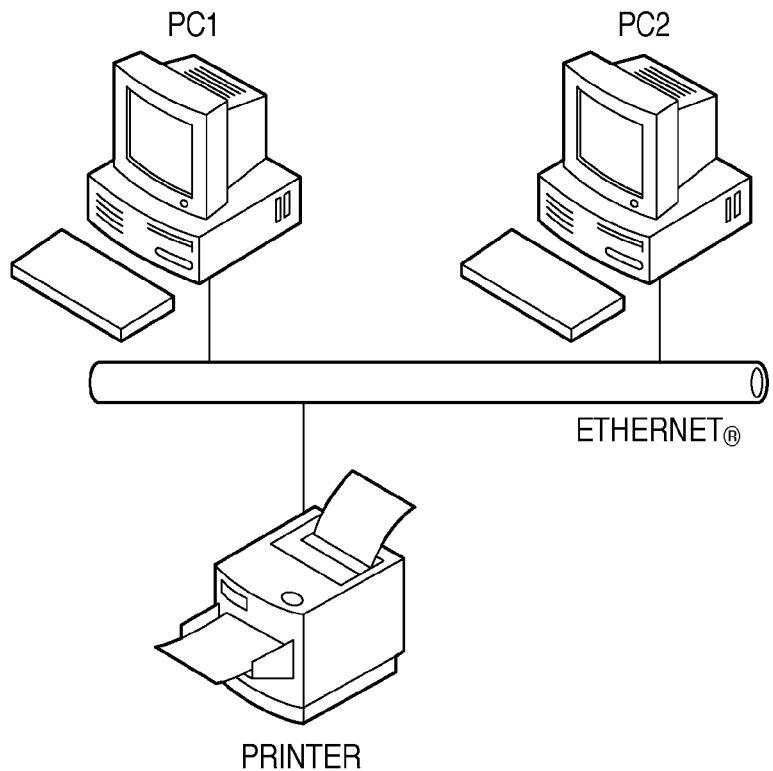
FIG. 7 is a view showing a use case environment using Ethernet®.
FIG. 8 is a view showing an example of a determination table required to determine whether or not to require an error continuous display.

FIGS. 6A and 6B are flowcharts each showing the operation in the printer according to the first embodiment. This embodiment will be described in detail below using FIGS. 5, 6A, and 6B. FIG. 7 shows an example of an information processing system in which a plurality of PCs are connected to a single printer. In this manner, the printer can be connected to the plurality of PCs. Also, a PC can be connected to a plurality of printers. For the sake of simplicity, the following description will be given under the assumption that two information processing apparatuses are connected to a single printer, and different users use these information processing apparatuses, as shown in FIG. 7. In this embodiment, assume that the state of the printer 200 is similarly displayed on the printer status display modules 412 of a PC1 and PC2 shown in FIG. 7. Of course, an image processing system of the present invention is also similarly applicable to an environment in which two or more information processing apparatuses and one or more printers are connected.

The flowchart shown in FIG. 5 will be described below in association with the operation of the information processing apparatus with reference to the block diagram shown in FIG. 4. Assume that the print execution module 405 of the printer 200 shown in FIG. 4 accepts a job execution designation output from the PC1 shown in FIG. 7, and is executing the job based on the execution designation.

The print control module 404 always checks in step S501 if an arbitrary error has occurred during execution of print processing. Upon detection of occurrence of an error, the print control module 404 notifies the job management module 403 and printer UI control module 406, and also the job information detection module 415 and display status management module 417 via the data transmission/reception modules 402 and 416 of error occurrence information.

In step S502, the display status management module 417, which received the notification of the error occurrence information, controls the printer status display module 412 and printer UI control module 406 to display contents of the error that has occurred. After the error display is made in step S502, the display status management module 417 monitors in step S503 whether or not it is notified of information indicating that the corresponding error is canceled.

If the error is canceled, the display status management module 417 cancels the error display displayed on the printer status display module 412 in step S519. Whether or not an error is canceled is mainly detected by the printer 200 (FIG. 4). For example, a sheet detection sensor on a sheet conveyance path in the printer 200 detects the absence of a sheet that has been jammed for a predetermined time or more, thereby canceling a jam error.

If the error is not canceled in step S503, it is determined in step S504 whether or not the occurred error is a skippable error. This determination is made by the display status management module 417 or print processing module 401. In the example of this embodiment, the display status management module 417 determines whether or not the error is a skippable error, with reference to a determination table as a skip determination table held in the RAM 103.

FIG. 8 shows an example of the determination table. A plurality of errors described in FIG. 8 respectively correspond to skippable errors. If the display status management module 417 determines an error which has occurred as a skippable error in step S504, the error skip buttons on the printer status display module 412 and the operation unit 205 on the printer 200 are enabled. The printer status display module 412 and operation unit 205 monitor in step S505 whether or not their error skip buttons are pressed.

If pressing of the error skip button is detected in step S505, the job data generation module 414 generates the same job data again and issues a job re-execution designation in step S506. The print processing module 401 of the printer, which received the job data from the data transmission/reception module 416, re-executes print processing. At this time, the display status management module 417 and printer UI control module 406 respectively cancel the error displays by accepting error display cancel designations on the printer status display module 412 and the display unit 206 on the printer 200, and control them to display "print in progress" instead.

On the other hand, if it is determined in step S504 that the error is not a skippable error, and if the error skip button is not pressed in step S505, the display status management module 417 controls the printer status display module 412 and display unit 206 to continue their error displays.

If the print control module 404 detects in step S507 that the executed re-print processing is normally terminated, the error continuous display determination module 418 determines in step S508 whether or not to require the continuous display of the skipped error. First, the error continuous display determination module 418 confirms if the pressed error skip button was the error skip button 306 (FIG. 3) on the printer 200. If the pressed error skip button was the error skip button 306 (FIG. 3) on the printer 200, the error continuous display determination module 418 determines in step S509 whether or not the skipped error requires a continuous display. This determination uses the determination table as the continuous display determination table shown in FIG. 8. That is, as shown in FIG. 8, errors which require a continuous display and those which do not require any continuous display are defined in advance. Examples of criteria of judgment of requirement of a continuous display are as follows:

an error seriously influences print processing and usability when it is not solved; and
an error can be easily solved by the user.

Next, the error continuous display determination module 418 confirms in step S510 if a next job (subsequent job) is present (accepted). Information of a job entered to the printer 200 can also be confirmed by the job information detection module 415 all the time. Hence, the error continuous display determination module 418 acquires information from the job information detection module 415 to confirm the presence/absence of the next job. If the next job is absent, the error continuous display determination module 418 judges in step S513 that an error continuous display is required, and notifies the display status management module 417 and printer UI control module 406 of that message. The display status management module 417 and printer UI control module 406 respectively control the printer status display module 412 and display unit 206 to display an error.

If the error continuous display determination module 418 confirms in step S510 that the next job is present, it determines further detailed conditions as follows. In step S511, the error continuous display determination module 418 confirms the user ID included in the job information acquired from the job information detection module 415. The error continuous display determination module 418 compares the job IDs, and if the same user entered the job that has caused the skipped error and the next job, that is, if the next job successively entered from the PC1 in FIG. 7, the error continuous display determination module 418 judges that an error continuous display is successively required. This is because the job entered by the same user is more likely to cause the same error, and the error is to be solved first to attain more appropriate print processing.

If the next job was entered from the PC2 in FIG. 7 in step S511, the error continuous display determination module 418 confirms the job information in more detail in step S512. The error continuous display determination module 418 checks if the skipped error is caused by a mismatch of sheet sizes, and the sheet size of the next job is the same as that of the error-skipped job. If the skipped error is caused by a mismatch of sheet sizes, and the sheet size of the next size is the same as that of the error-skipped job, the error continuous display determination module 418 judges in step S513 that an error continuous display is required. This is because even when a different user entered the next job, an error of a sheet size mismatch is more likely to occur. This embodiment exemplified the sheet size mismatch error in step S512. When errors are more likely to successively occur in this way, it is judged that an error continuous display is similarly required for another error.

After completion of the re-print processing in step S507, if the error skip button of the printer status display module 412 is pressed in step S508 or if the skipped error does not require any continuous display in step S509, and if sheet sizes are different in step S512, it is judged that an error continuous display is not performed. In this case, the display status management module 417 and printer UI control module 406 respectively designate the printer status display module 412 and display unit 206 to make the same display as that after completion of normal print processing without making any error display.

In step S513, an error continuous display is made. During the error display, it is monitored in step S514 if the next job is entered. If it is detected that the next job is entered, whether or not to require an error continuous display is determined in steps S515 and S516 in the same manner as described in steps S511 and S512.

If the error continuous display cancel conditions are not satisfied in steps S514 to S516, it is confirmed in step S517 whether or not the error continuous display cancel button on one of the printer status display module 412 and the operation unit 205 on the printer 200 is pressed. If the error continuous display cancel button is not pressed in step S517, it is confirmed whether or not a predetermined time elapses since the beginning of the error continuous display. Steps S514 to S518 are repetitively executed before an elapse of the predetermined time is confirmed. After an elapse of the predetermined time, the error display is canceled in step S519. If sheet sizes are different in step S516 before an elapse of the predetermined time, or if the error continuous display cancel button is pressed in step S517, the error display is also canceled in step S519.

The operation of the printer will be described below using FIGS. 6A and 6B. In this case as well, assume that the print execution module 405 of the printer 200 is executing a job. The print control module 404 always monitors a print state in step S601 as to whether or not an arbitrary error has occurred during print processing. If no occurrence of an error is detected and the print processing is normally terminated in step S602, the control waits until the next job is entered.

If the print control module 404 detects occurrence of an error in step S602, the process advances to step S603. In step S603, the print control module 404 notifies the job management module 403 and printer UI control module 406, and also the job information detection module 415 and display status management module 417 via the data transmission/reception modules 402 and 416 of information associated with the occurred error. In step S604, the display status management module 417, which received the notification of occurrence of the error, designates the printer UI control module 406 to display error contents, and the printer UI control module 406 turns on one or more of the error notification LEDs 301 to 304 on the display unit 206. After the error display is made in step S604, the print processing module 401 monitors in step S605 whether or not the error is canceled.

If a cause of the error is not canceled in step S606, the print control module 404 monitors whether or not an input from the operation unit 205 is detected. If the job cancel button 305 is not pressed in step S608, the print control module 404 confirms in next step S609 whether or not the error skip button 306 (FIG. 3) is pressed. If the error skip button 306 (FIG. 3) is not pressed in step S609, the control returns to monitoring of an error cause again. If it is detected in step S606 that a cause of the error is canceled, or if it is detected in step S608 that the job cancel button 305 (FIG. 3) is pressed, the process advances to step S622. In step S622, the print control module 404 notifies the job information detection module 415 and display status management module 417 of the information processing apparatus 100 of that message. After that, if the printer UI control module 406 receives an error display cancel designation from the display status management module 417 of the information processing apparatus 100 in step S620b, it turns off the error notification LEDs in step S621.

On the other hand, if it is detected in step S609 that the error skip button 306 (FIG. 3) is pressed, the print control module 404 notifies the job information detection module 415 and display status management module 417 of the information processing apparatus 100 of that message in step S610. Upon pressing of the error skip button, the job that has caused the error is cleared, and the job data generation module 414 of the information processing apparatus 100 generates a job again.

In step S611, the print processing module 401 waits for the re-generated job sent from the data transmission/reception module 416. If the re-generated job is received, the print processing module 401 activates the job management module 403, print control module 404, and print execution module 405 in step S612 to execute re-print processing. If an error has occurred during the re-print processing in step S613, the process returns to that in step S603 again. If it is judged in step S613 that the print processing is normally terminated, the print control module 404 notifies the job information detection module 415 and display status management module 417 of the information processing apparatus 100 of that message in step S614.

After the notification in step S614, if no error continuous display designation is received from the information processing apparatus 100 in step S615, the processing ends with the normal termination of the re-print processing. On other hand, if the error continuous display designation is received from the information processing apparatus 100 in step S615, printer UI control module 406 turns on the error notification LEDs in step S616. After that, the print control module 404 monitors an input from the operation unit 205 in step S617, and monitors in step S618 whether or not the error continuous display cancel button 307 (FIG. 3) is pressed.

If the error continuous display cancel button 307 (FIG. 3) is pressed in step S618, the print control module 404 notifies the display status management module 417 of the information processing apparatus 100 of that message in step S619. After pressing of the error continuous display cancel button 307 (FIG. 3) is notified in step S619, it is confirmed in step S620b if an error display cancel designation is received from the information processing apparatus 100 during monitoring of pressing of the error continuous display cancel button 307 (FIG. 3). If the designation is received, the print control module 404 turns off the error notification LEDs in step S621, and returns to a normal state. If the error continuous display cancel button 307 (FIG. 3) is not pressed in step S618, and if no error display cancel designation is received from the information processing apparatus 100 in step S620a, the process returns to that in step S617.

Figure 9A:
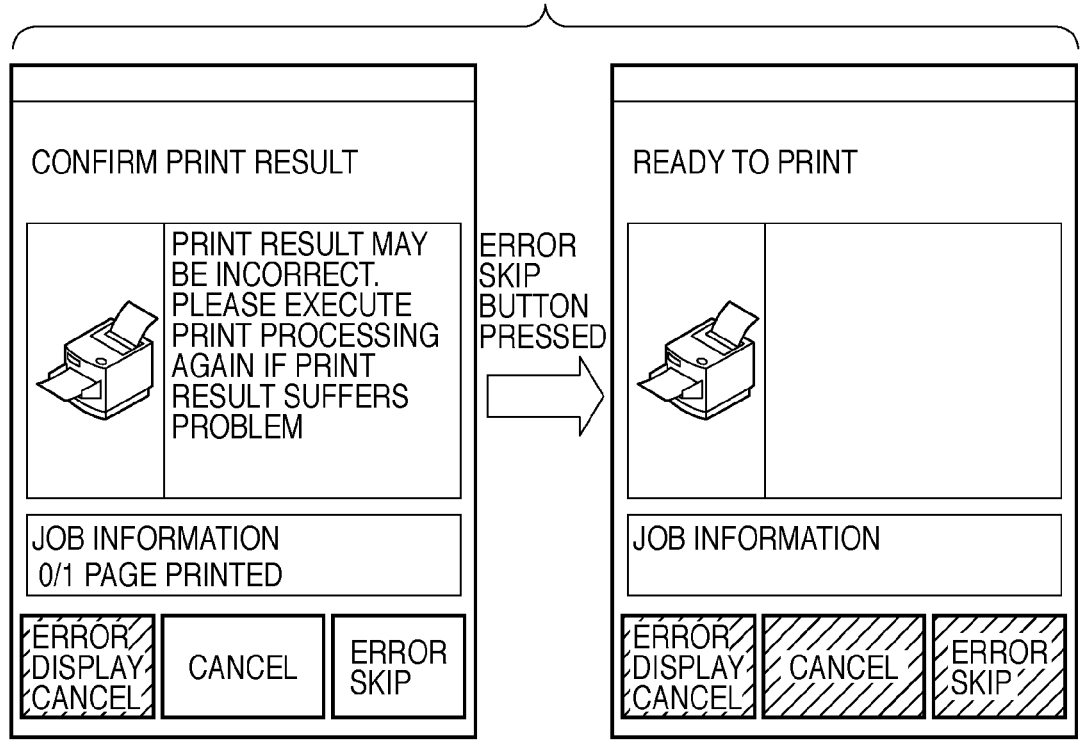
FIGS. 9A and 9B are views showing practical examples of error continuous displays.
Figure 9B:
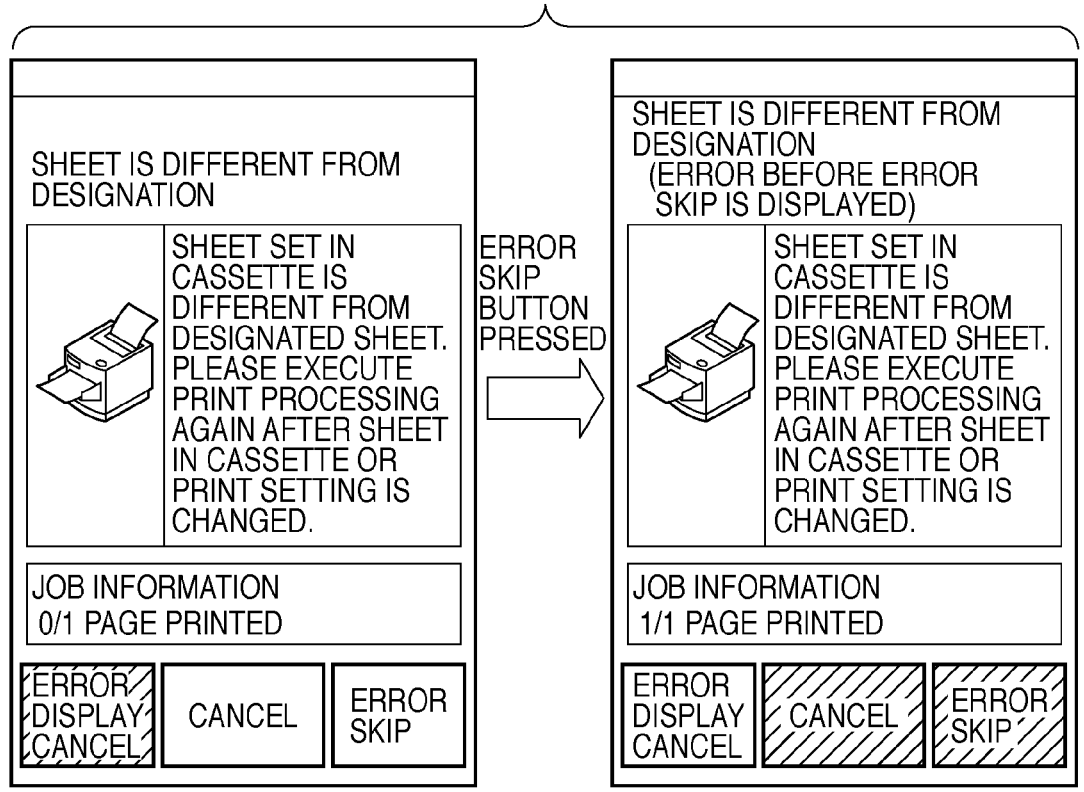

FIGS. 9A and 9B show display examples of the printer status display module 412 when an error continuous display is made. FIG. 9A shows an example in which no error continuous display is made at the time of execution of the error skip operation, and shows an error indicating that the print result may be incorrect. After the error skip button 306 (FIG. 3) is pressed in step S505, and the re-print processing is normally terminated, since it is determined in step S509 that an error continuous display is not required, an error is not displayed after the print processing, and a message indicating that the next print processing is ready is displayed. This error is defined as that which does not require any error continuous display since it mechanically and accidentally occurs due to bad sheet conveyance in many cases, and it is difficult for the user to prevent such error by himself or herself.

On the other hand, FIG. 9B shows an example in which an error continuous display is made at the time of execution of the error skip operation, and shows an error when a sheet size of printed sheets is different from that designated by a job. After the error skip button 306 (FIG. 3) is pressed in step S505, and the re-print processing is normally terminated, since it is determined in step S509 that an error continuous display is required, an error is continuously displayed after the print processing. This error occurs when the sheet size which is designated by the user on the print designation module 413 is different from that of sheets used in actual print processing. It is easy for the user to prevent this error by exchanging sheets stored in a cassette. When the error is skipped, it is more likely to obtain an incorrect print result. Hence, this error is defined as that which requires an error continuous display.

Note that at the time of an error continuous display, a display state is different from that at the time of a normal error display, as shown in FIG. 9B. For example, in the normal error display, an error display area displays a message indicating that an error continuous display is in progress, and the cancel buttons are disabled since the job is complete, that is, the job has already been output. In this case, hatched buttons in FIGS. 9A and 9B indicate that button pressing is disabled. The examples of FIGS. 9A and 9B include the error continuous display cancel button. However, in order to reduce cost, the number of buttons may be reduced, so that the error skip button serves as the error continuous display cancel button during the error continuous display. In this manner, as for the display state during the error continuous display, the display method described using FIGS. 9A and 9B is merely an example, and any other display methods may be adopted.

Second Embodiment

In the first embodiment, an error continuous display is made on all PCs independently of a PC which transmitted an error-skipped job. However, when a printer is used via a network, an error continuous display is also made for a user different from the user who skipped the error. If this display is made, that user may misunderstand that print processing is disabled due to an error or may entertain doubts about the error display itself. Hence, a case will be examined wherein an error continuous display target after the error skip operation is limited to only the user who skipped the error. In the second embodiment, in a PC1 and PC2 shown in FIG. 7, for example, when an error that has occurred in a job from the PC1 is skipped, an error continuous display is made only on the PC1. In order to implement this, two methods may be used.

In the first method, a printer status display module 412 on each PC acquires, from a job information detection module 415 (FIG. 4), information required to determine whether or not the error-skipped job was entered by itself. Then, if the printer status display module 412 determines that the error-skipped job was not entered by itself, an error continuous display is not made. This method can be implemented when a system includes an information processing apparatus 100 and printer 200 as an image forming apparatus shown in FIG. 4.

The second method is a method in which a printer notifies only a PC which entered an error-skipped job of information indicating that an error continuous display is made. However, in the arrangement described so far, since the printer does not hold any job information that caused the skipped error, the printer side is required to have a function of holding this information. Also, a function equivalent to an error continuous display determination module 418 (FIG. 4) is required on the printer side. If the printer side has this function of the error continuous display determination module 418, an error continuous display target after the error skip operation can be limited to the user who designated to skip the error.

As described above, since the second embodiment adopts the arrangements that can implement the aforementioned two methods, an error can be prevented from being displayed for an unrelated user who uses the printer via the network, and a problem that confuses the user can be solved.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-298832 filed Dec. 28, 2009, which is hereby incorporated by reference herein in its entirety.

What is claimed is:

1. An information processing apparatus comprising:
a designation unit configured to designate an image forming apparatus to execute a job;
a transmission unit configured to transmit the job to the image forming apparatus;
a reception unit configured to receive, in a case where an error has occurred in the image forming apparatus due to execution of the job, error information indicating that the error has occurred;
a display unit configured to display the error information on a screen in a case where the reception unit receives the error information;
an acquisition unit configured to acquire, from the image forming apparatus, information indicating that a user operated an operation unit, which is provided on the image forming apparatus, for skipping the error which has occurred in the image forming apparatus;
a determination unit configured to determine, in accordance with a table which stores error information regarding those errors for which display of the error information is required to continue to be displayed and those errors for which display of the error information is not required to continue to be displayed, in a case where said acquisition unit acquires the information, whether the error information of the skipped error displayed on the screen is required to continue to be displayed; and
a control unit configured to continue, in a case where said determination unit determines that the error information of the skipped error displayed on the screen is required to continue to be displayed, to continue to display the error information of the skipped error on the screen, and to cancel, in a case where said determination unit determines that the error information of the skipped error displayed on the screen is not required to continue to be displayed, display of the error information of the skipped error on the screen to remove the error information of the skipped error from the screen.

2. The apparatus according to claim 1, further comprising a re-execution designation unit configured to designate the image forming apparatus to re-execute a job when said acquisition unit acquires the information.

3. The apparatus according to claim 1, wherein in a case where a subsequent job to be executed after the job which is being executed is present, and a user who transmitted the subsequent job is the same as a user who transmitted the job which is being executed, said control unit continues to display the error information.

4. The apparatus according to claim 1, wherein in a case where a subsequent job to be executed after the job which is being executed is present, and a user who transmitted the subsequent job is not the same as a user who transmitted the job which is being executed, and a cause of the error is due to a mismatch of sheet sizes of the image forming apparatus, and a sheet size used in the job which is being executed is not the same as a sheet size used in the subsequent job, said control unit cancels display of the error information.

5. The apparatus according to claim 1, wherein said acquisition unit acquires the information indicating that the user operated an operation unit of the information processing apparatus for skipping the error which has occurred in the image forming apparatus, and
    said determination unit determines, depending on the type of the error, in a case where said acquisition unit acquires the information indicating that the user operated the operation unit being provided on the image forming apparatus for skipping the error which has occurred in the image forming apparatus, whether or not to continue to display the error information which is being displayed on the screen.

6. An information processing system including a plurality of information processing apparatuses and an image forming apparatus connectable to each of said plurality of information processing apparatuses,
    wherein one of said plurality of information processing apparatuses comprises:
    a designation unit configured to designate said image forming apparatus to execute a job;
    a transmission unit configured to transmit the job to the image forming apparatus;
    a reception unit configured to receive, in a case where an error has occurred in said image forming apparatus due to execution of the job, error information indicating that the error has occurred;
    a display unit configured to display the error information on a screen in a case where the reception unit receives the error information;
    an acquisition unit configured to acquire, from the image forming apparatus, information indicating that a user operated an operation unit, which is provided on the image forming apparatus, for skipping the error which has occurred in the image forming apparatus;
    a determination unit configured to determine, in accordance with a table which stores error information regarding those errors for which display of the error information is required to continue to be displayed and those errors for which display of the error information is not required to continue to be displayed, in a case where said acquisition unit acquires the information, whether the error information of the skipped error displayed on the screen is required to continue to be displayed; and
    a control unit configured to continue, in a case where said determination unit determines that the error information of the skipped error displayed on the screen is required to continue to be displayed, to continue to display the error information of the skipped error on the screen, and to cancel, in a case where said determination unit determines that the error information of the skipped error displayed on the screen is not required to continue to be displayed, display of the error information of the skipped error on the screen to remove the error information of the skipped error from the screen.

7. A control method of an information processing apparatus, comprising:
    a designation step of controlling a designation unit to designate an image forming apparatus to execute a job;
    a transmission step of transmitting the job to the image forming apparatus;
    a reception step of controlling a reception unit to receive, in a case where an error has occurred in the image forming apparatus due to execution of the job, error information indicating that the error has occurred;
    a display step of controlling a display unit to display the error information on a screen in a case where the reception unit receives the error information;
    an acquisition step of controlling an acquisition unit to acquire, from the image forming apparatus, information indicating that a user operated an operation unit, which is provided on the image forming apparatus, for skipping the error which has occurred in the image forming apparatus;
    a determination step of controlling a determination unit to determine, in accordance with a table which stores error information regarding those errors for which display of the error information is required to continue to be displayed and those errors for which display of the error information is not required to continue to be displayed, in a case where the information is acquired in the acquisition step, whether the error information of the skipped error displayed on the screen is required to continue to be displayed; and
    a control step of controlling a control unit to continue, in a case where it is determined in the determination step that the error information of the skipped error displayed on the screen is required to continue to be displayed, to continue to display the error information of the skipped error on the screen, and to cancel, in a case where it is determined in the determination step that the error information of the skipped error displayed on the screen is not required to continue to be displayed, display of the error information of the skipped error on the screen to remove the error information of the skipped error from the screen.

8. A non-transitory computer-readable storage medium storing a program for controlling a computer to execute the control method of the information processing apparatus according to claim 7.

* * * * *